(12) United States Patent
Medved et al.

(10) Patent No.: US 8,954,491 B1
(45) Date of Patent: *Feb. 10, 2015

(54) DYNAMICALLY GENERATING APPLICATION-LAYER TRAFFIC OPTIMIZATION PROTOCOL ENDPOINT ATTRIBUTES

(75) Inventors: Jan Medved, Pleasanton, CA (US); David Ward, Los Gatos, CA (US); Reinaldo Penno, San Jose, CA (US); Satish Raghunath, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 975 days.

This patent is subject to a terminal disclaimer.

(21) Appl. No.: 12/982,153

(22) Filed: Dec. 30, 2010

(51) Int. Cl.
*G06F 15/16* (2006.01)

(52) U.S. Cl.
USPC ........... 709/203; 709/201; 709/202; 709/238; 709/242

(58) Field of Classification Search
USPC ......... 709/201, 202, 203, 220, 221, 222, 238, 709/240, 239, 242
See application file for complete search history.

(56) References Cited

U.S. PATENT DOCUMENTS

| | | | |
|---|---|---|---|
| 7,716,662 B2 * | 5/2010 | Seiden | 717/173 |
| 7,978,708 B2 | 7/2011 | Filsfils et al. | |
| 8,179,801 B2 | 5/2012 | Previdi et al. | |
| 2002/0128768 A1 * | 9/2002 | Nakano et al. | 701/202 |
| 2003/0179742 A1 * | 9/2003 | Ogier et al. | 370/351 |
| 2006/0085829 A1 | 4/2006 | Dhodapkar et al. | |
| 2007/0064702 A1 * | 3/2007 | Bates et al. | 370/392 |
| 2009/0122718 A1 | 5/2009 | Klessig et al. | |
| 2009/0234715 A1 * | 9/2009 | Heiser et al. | 705/10 |
| 2010/0161755 A1 * | 6/2010 | Li et al. | 709/217 |
| 2010/0278076 A1 * | 11/2010 | Reddy et al. | 370/254 |
| 2010/0293294 A1 * | 11/2010 | Hilt et al. | 709/241 |
| 2011/0078230 A1 * | 3/2011 | Sepulveda | 709/203 |
| 2011/0202651 A1 * | 8/2011 | Hilt et al. | 709/224 |
| 2011/0276718 A1 * | 11/2011 | Steiner et al. | 709/241 |
| 2012/0066368 A1 | 3/2012 | Li et al. | |
| 2012/0317293 A1 * | 12/2012 | Gu et al. | 709/226 |

OTHER PUBLICATIONS

Response to Office Action dated Apr. 29, 2013, from U.S. Appl. No. 13/110,987, filed Aug. 29, 2013, 30 pp.
Office Action from U.S. Appl. No. 12/861,671, dated Aug. 17, 2012, 17 pp.

(Continued)

*Primary Examiner* — Dhairya A Patel
(74) *Attorney, Agent, or Firm* — Shumaker & Sieffert, P.A.

(57) ABSTRACT

In general, techniques are described for dynamically generating attributes from routing topology information and assigning dynamically generated attributes to network map entries to further characterize PIDs described therein. For example, a provider or other entity assigns, within a network device, endpoint types to one or more address prefixes for which the network device originates or forwards route advertisements. For each typed prefix, the network device adds an endpoint type identifier for the assigned endpoint type to route advertisements that traverse or originate with the network device and specify the prefix. An ALTO server peers with router advertisers to receive route advertisements. When the ALTO server receives a route advertisement that includes an endpoint type identifier, the ALTO server maps the endpoint type identifier to a PID attribute and assigns the PID attribute to a PID that includes a prefix identified in the route advertisement.

21 Claims, 6 Drawing Sheets

(56) References Cited

OTHER PUBLICATIONS

Response to Office Action dated Aug. 17, 2012, from U.S. Appl. No. 12/861,671, filed Nov. 19, 2012, 19 pp.
Response to Final Office Action dated Mar. 29, 2013, from U.S. Appl. No. 12/861,671, filed Jul. 1, 2013, 15 pp.
Office Action from U.S. Appl. No. 13/110,987, dated Apr. 29, 2013, 38 pp.
Final Office Action from U.S. Appl. No. 12/861,671, dated Mar. 29, 2013, 21 pp.
Alimi et al., "ALTO Protocol," draft-ietf-alto-protocol-03.txt, ALTO WG Internet-Draft, Mar. 8, 2010, 53 pp.
Alimi et al., "ALTO Protocol," draft-ietf-alto-protocol-06.txt, ALTO WG Internet-Draft, Oct. 25, 2010, 66 pp.
Penno et al., "ALTO Protocol," draft-penno-alto-protocol-00.txt, ALTO WG, Internet-Draft, Mar. 4, 2009, 22 pp.
Penno et al., "ALTO and Content Delivery Networks," draft-penno-alto-cdn-00, Network Working Group, Internet Draft, Jun. 4, 2010, 19 pp.
Penno et al., "ALTO and Content Delivery Networks", draft-penno-alto-cdn-03, Network Working Group, Internet Draft, Mar. 14, 2011, 28 pp.
Zimmermann, "OSI Reference Model—The ISO Model of Architecture for Open Systems Interconnection," IEEE Transactions on Communications, vol. 28, No. 4, Apr. 1980, pp. 425-432.
Seedorf et al., "Application-Layer Traffic Optimization (ALTO) Problem Statement," RFC 5693, Network Working Group, Oct. 2009, 15 pp.
Rekhter et al., "A Border Gateway Protocol 4 (BGP-4)", Network Working Group, RFC 4271, Jan. 2006, 93 pp.
Gredler et al., "Advertising Traffic Engineering Information in BGP", draft-gredler-bgp-te-00, Inter-Domain Routing, Internet Draft, submitted and published Mar. 4, 2011, 18 pp.
Chandra et al., "BGP Communities Attribute", Network Working Group, RFC 1997, Aug. 1996, 6 pp.
U.S. Appl. No. 12/235,677, by Anjan Venkatramani, filed Sep. 23, 2008.
U.S. Appl. No. 12/861,645, by Jan Medved, filed Aug. 23, 2010.
U.S. Appl. No. 12/942,678, by Jan Medved, filed Nov. 9, 2010.
U.S. Appl. No. 12/861,671, by Jan Medved, filed Aug. 23, 2010.
U.S. Appl. No. 12/861,681, by Satish Raghunath, filed Aug. 23, 2010.
U.S. Appl. No. 13/110,987, by Jan Medved, filed May 18, 2011.
Office Action from U.S. Appl. No. 12/861,671, dated Feb. 3, 2014, 9 pp.
Response to Office Action dated Feb. 3, 2014, from U.S. Appl. No. 12/861,671, filed May 5, 2014, 9 pp.
Final Office Action from U.S. Appl. No. 12/861,671, dated Aug. 29, 2014, 12 pp.

\* cited by examiner

DYNAMICALLY GENERATING APPLICATION-LAYER TRAFFIC OPTIMIZATION PROTOCOL ENDPOINT ATTRIBUTES

TECHNICAL FIELD

The invention relates to computer networks and, more specifically, to enhancing content delivery.

BACKGROUND

Peer-to-peer (P2P) and content delivery networks (CDNs) applications serve large amounts of data and generate significant amounts of network traffic. These applications leverage multiple copies of data content populated to multiple different network nodes to allow a requesting agent to obtain portions of the data content from one or more of many possible data sources. Distributing data content to multiple nodes for delivery on behalf of applications such as file sharing, real-time communication, and on-demand media streaming improves application performance and scalability.

P2P and CDN application clients often select resources naively, that is, without incorporating network topology information or related details. Rather, clients rely on heuristics to approximate such information. As a result, network data traffic exchanged using these applications may congest network links, cross service provider network boundaries multiple times, and generally transit the communication network in a manner that is suboptimal from a user-standpoint and undesirable from the point of view of the service provider. For instance, while two peers may be members of the same service provider network, an overlay link connecting the peers may nevertheless traverse multiple network boundaries, which unnecessarily increases the inter-peer transit costs to the service provider. Furthermore, although distributed applications capitalize on excess bandwidth at the data sources to improve throughput and reduce latencies for end-users while also reducing the burden of content providers to provision application servers, the ability to cheaply distribute data content comes at the expense of service providers, which bear the cost of inefficiently transporting network data.

A service provider, content provider, or a third party may provide an Application-Layer Traffic Optimization (ALTO) protocol service to provide guidance to application clients and content request routers regarding selection of a particular resource from which to obtain data content. The ALTO service provides information that incorporates provider preferences with regard to network resources to influence network resource consumption patterns while maintaining or improving application performance. In one example, a service provider provisions an ALTO server for a service provider network with network topology and topology link cost information. Application clients and content request routers send ALTO requests to the ALTO server to obtain a network map and a corresponding cost map. The network map specifies a sub-set of topological groupings, or "PIDs" defined by the ALTO server for the network. A particular PID within a network map may represent a single device or device component, a collection of devices such as a network subnet, a service provider network, or some other grouping. A cost map for a corresponding network map defines provider preferences respecting inter-PID routing costs for connections among the various PIDs of the network map. Using the network map and cost map provided by the ALTO server, application clients and content request routers select serving resources to minimize costs, as specified by the ALTO maps, between content requesting clients and available resources.

As a result, service providers provisioning the ALTO server may direct application clients and request routers to select resources according to service provider preferences, which may include optimizing throughput and/or user experience, for instance, reducing costs to the service provider, or promoting other provider objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety.

SUMMARY

In general, techniques are described for dynamically generating attributes from routing topology information and assigning the dynamically generated attributes to network map entries to further characterize PIDs described therein. In a CDN context, for example, adding attributes to network map entries that specify whether a particular PID is of type "host," "CDN cache node," "mobile host," or "wireline host" enables an ALTO service when generating cost maps to disambiguate multiple different PID types to fulfill service provider preferences. For example, an ALTO server may use PID attributes to generate and provide, to a CDN request router, a cost map that has cost map entry values set to infinity for inter-CDN cache node pairs and inter-host pairs. The request router, upon receiving a content request (e.g. an HTTP GET request) from a host, consequently selects a CDN cache node as the content resource due to infinite costs specified in the cost map for paths to other hosts.

In one example, a provider or other entity assigns, within a network device, endpoint types to one or more address prefixes for which the network device originates or forwards route advertisements. For each typed prefix, the network device adds an endpoint type identifier for the assigned endpoint type to route advertisements that traverse or originate with the network device and specify the prefix. An ALTO server peers with route advertisers to receive route advertisements. When the ALTO server receives a route advertisement that includes an endpoint type identifier, the ALTO server maps the endpoint type identifier to a PID attribute and assigns the PID attribute to a PID that includes a prefix identified in the route advertisement.

In one embodiment, the invention is directed to a method comprising executing a routing protocol on an application-layer traffic optimization (ALTO) server to maintain layer three (L3) network topology information defining routes to endpoints of a network. The method further comprises receiving, with the routing protocol, a topology information advertisement, wherein the topology information advertisement specifies one or more routes and includes network address information identifying one or more of the endpoints, wherein the topology information advertisement further includes an endpoint type identifier that represents an endpoint type for the identified endpoints. The method also comprises aggregating, with the ALTO server, the endpoints into a set of one or more subsets of topological groupings (PIDs), wherein each PID is associated with a different subset of the endpoints. The method additionally comprises assigning a PID attribute value corresponding to the endpoint type identifier to each of the PIDs associated with any of the identified endpoints, wherein a PID attribute value specifies an endpoint type for the subset of endpoints associated with the PID, wherein the endpoint type affects calculations of layer seven (L7) costs among the set of one or more PIDs by the ALTO server. The method further comprises generating, with the ALTO server, an ALTO network map that includes a PID entry to describe each of the PIDs, wherein each PID entry includes a PID-type field that stores the assigned PID attribute value for the PID described by the PID entry.

In another embodiment, the invention is directed to an application-layer traffic optimization (ALTO) server comprising a control unit comprising one or more processors. The ALTO server additionally comprises a topology information base of the control unit that stores network topology information for a network of endpoints, and a routing protocol listener of the control unit that executes a routing protocol to maintain layer three (L3) network topology information defining routes within the network, wherein the routing protocol receives a topology information advertisement that specifies one or more routes and includes network address information identifying one or more of the endpoints, wherein the topology information advertisement further includes an endpoint type identifier that represents an endpoint type for the identified endpoints. The ALTO server also includes a PID generator of the control unit that aggregates the endpoints into a set of one or more subsets of topological grouping (PIDs), wherein each PID is associated with a different subset of the endpoints. The ALTO server further comprises an attribute module of the control unit that assigns a PID attribute value corresponding to the endpoint type identifier to each of the PIDs associated with any of the identified endpoints, wherein a PID attribute value specifies an endpoint type for the subset of endpoints associated with the PID, wherein the endpoint type affects calculations of layer seven (L7) costs among the set of one or more PIDs by the ALTO server. The ALTO server further comprises a network map module that generates an ALTO network map that includes a PID entry to describe each of the PIDs, wherein each PID entry includes a PID-type field that stores the assigned PID attribute value for the PID described by the PID entry.

In another embodiment, the invention is directed to a network device that advertises network topology information for a network of endpoints, comprising a control unit comprising one or more processors. The network devices also comprises a routing daemon of the control unit that sets an endpoint type identifier for a subset of the network of endpoints within a topology information advertisement, wherein the topology information advertisement specifies one or more routes and includes network address information corresponding to the subset of the network of endpoints, wherein the routing daemon outputs the topology information advertisement to an Application Layer Traffic Optimization (ALTO) server, wherein the endpoint type identifier affects calculations of layer seven (L7) costs among a set of one or more topological groupings (PIDs) by the ALTO server.

The described techniques may provide one or more advantages. For instance, dynamically generating attributes from routing topology information may allow the providers, individually responsible for various subnets of a network that includes multiple administrative domains, to inform applications via the ALTO service of application-relevant subnet characteristics. In other words, the operator "closest to" a subnet can be responsible for the treatment of that subnet by the ALTO service and clients of that service. As a result, the techniques may improve subsidiarity among network entities and operators that cooperate to facilitate content distribution, thereby relieving configuration pressures on ALTO servers and administrators thereof.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
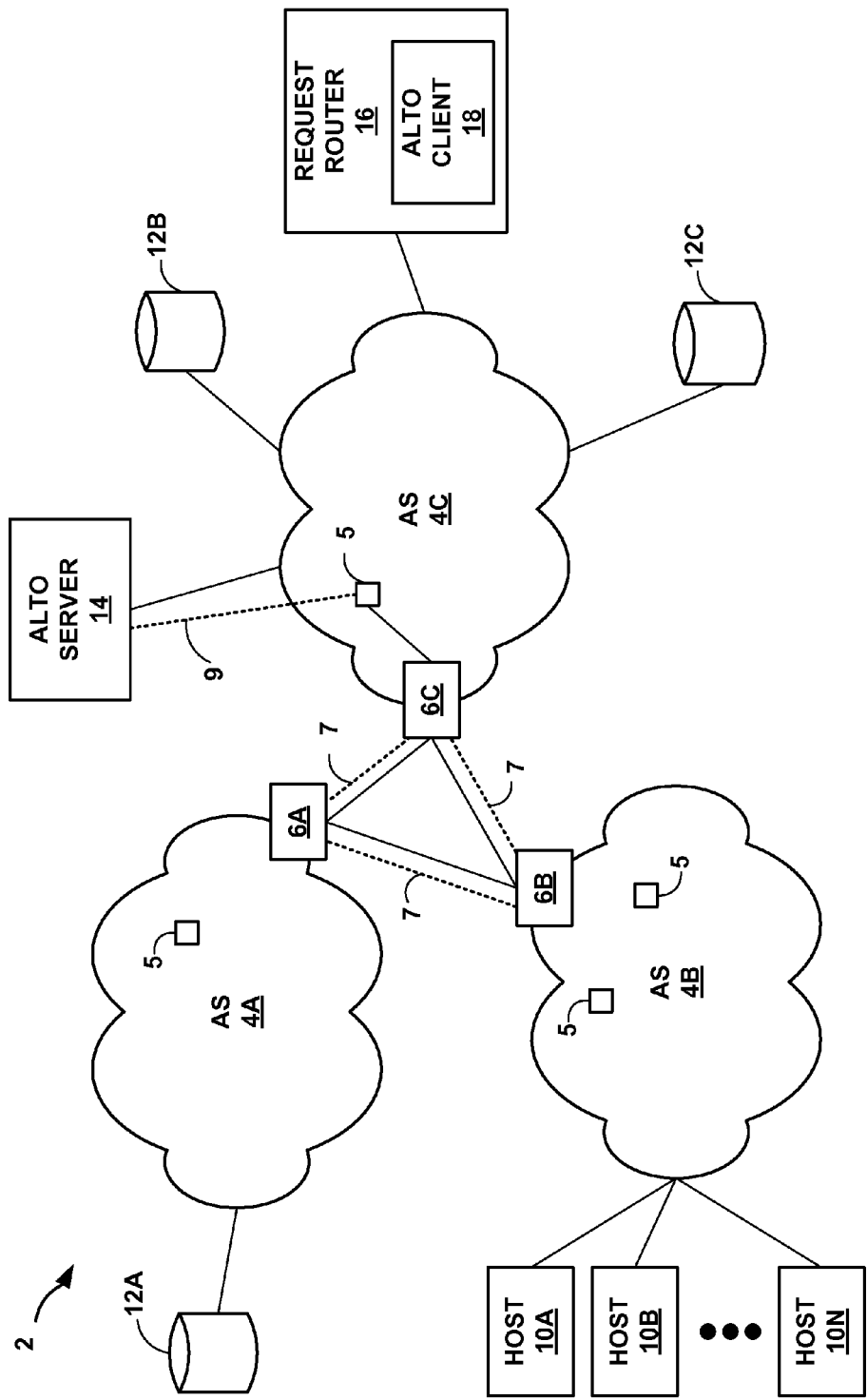
FIG. 1 is a block diagram illustrating an example network that dynamically assigns attributes, using advertised topology information, for use in an Application-Layer Traffic Optimization (ALTO) service.

FIG. 1 is a block diagram illustrating an example network 2 that dynamically assigns attributes, using advertised topology information, for use in an Application-Layer Traffic Optimization (ALTO) service. Network 2 comprises autonomous systems 4A-4C (illustrated as "ASs 4A-4C" and collectively referred to herein as "autonomous systems 4") interconnected by respective autonomous system border routers (ASBRs) 6A-6C. Autonomous systems 4 each run one or more interior gateway protocols (IGPs), such as Open Shortest Path First (OSPF), Routing Information Protocol, and Intermediate System-to-Intermediate System (IS-IS), and includes a set of one or more routers operating within a single administrative domain according to a routing policy. In the illustrated embodiment, each of ASBRs 6 includes one or more routing protocol speakers 5. Each of routing protocol speakers 5 may comprise, for example, an Interior Border Gateway Protocol (IBGP) router. Any of routing protocol speakers 5 may also, or alternatively, comprise a route reflector. Each of autonomous systems 4 has an identification number provided by an Internet registry or by an Internet service provider (ISP) that uniquely identifies the autonomous system to other autonomous systems. In various embodiments, each of autonomous systems 4 may represent a service provider network, an enterprise or campus network, or a content access network (CAN), for example. Autonomous system 4 may be alternatively configured to include additional ASBRs 6 that interconnect the autonomous systems in any of a number of configurations. Internal communication links of autonomous systems 4 are generally not shown in FIG. 1 for each of illustration.

Network 2 comprises a content delivery network having content delivery network (CDN) cache nodes 12A-12C ("CDN nodes 12") that store replicated content and serve that content to requesting devices using, for example, a transmission control protocol (TCP) or user datagram protocol (UDP) session operating over network devices of autonomous systems 4. Each of CDN nodes 12 may include one or more data servers, web servers, application servers, databases, computer clusters, mainframe computers, and any other type of server, computing element, and/or database that may be employed by a content provider or other entity to facilitate the delivery of content from the CDN node. In the illustrated embodiment, CDN node 12A connects via a communication link to autonomous system 4A, which transports content requests and content to requesting devices, such as hosts 10, within network 2. Similarly, CDN nodes 12B, 12C connect via respective communication links to autonomous system 4C, which transports content requests and content to requesting devices within network 2, such as hosts 10.

A content provider or other entity administers CDN nodes 12 to optimize content delivery using load balancing techniques, caching, request routing, and/or content services. CDN nodes 12 may mirror content, though any of CDN nodes 12 may provide different services and data content than that provided by the other CDN nodes. While application of the techniques is described herein with respect to selecting a serving node of a content delivery network, the techniques are applicable to other network types, such as P2P networks. Accordingly, network 2 may in some embodiments represent the Internet or any other packet-based, publicly accessible computer network that transports content sourced by CDN nodes 12 for delivery to requesting devices.

Hosts 10A-10N access autonomous system 4B to issue content requests to and receive application-related content from CDN nodes 12 for hosted applications. Each of hosts 10A-10N may represent, for example, workstations, desktop computers, laptop computers, cellular or other mobile devices, Personal Digital Assistants (PDAs), and any other device capable of accessing a computer network via a wireless and/or wired connection. In some embodiments, hosts 10 are members of a customer network served by autonomous system 4B. In some embodiments, CDN nodes 12 represent additional hosts that connect to autonomous systems 4 and execute a peer-to-peer (P2P) application for exchanging content among the various hosts, including hosts 10, that also execute the P2P application.

ASBRs 6 execute an exterior gateway protocol (EGP) to exchange, in peering sessions 7, topology information for respective autonomous systems 4. For example, ASBR 6A, 6B exchange topology information that describes an interior topology of respective autonomous systems 4A, 4B. Topology information for one of autonomous systems 4 outputted by one of ASBRs 6 in a peering session typically includes topology information received from one or more interior routing protocol speakers 5 of autonomous systems 4 executing an IGP, such as IBGP, or received in another one of EGP peering sessions 7 from another one of ASBRs 6. Topology information may also include administratively configured routes or other information on ASBRs 6. The EGP used for EGP peering sessions 7 may comprise, for instance, the Exterior Gateway Protocol or Exterior Border Gateway Protocol (eBGP). Each of peering sessions 7 may comprise a Transmission Control Protocol (TCP) session between corresponding pairs of ASBRs 6.

A service provider of one or more of autonomous systems 4, a content provider of the CDN that constitutes CDN nodes 12, or another entity employs Application-Layer Traffic Optimization (ALTO) server 14, connected to autonomous system 4C, to provide an ALTO service over autonomous systems 4. In general, the ALTO service enables service and/or content providers to influence the selection process to further service/content provider objectives, which may include improving a user experience by selecting the most geographically proximate one of CDN nodes 12 to a requesting one of hosts 10, reducing transmission costs to the provider, load balancing, service-level discrimination, accounting for bandwidth constraints, and other objectives. Further details regarding the use of an ALTO service in CDNs may be found in R. Penno et al., "ALTO and Content Delivery Networks: draft-penno-alto-cdn-00," Network Working Group, the Internet Engineering Task Force draft, June 2010, which is incorporated herein by reference in its entirety. Furthermore, while described with respect to the ALTO service and ALTO servers as described in Seedorf et al., incorporated above, the techniques are applicable to any form of application-layer traffic optimization.

ALTO server 14 generates a network map and cost map for network 2 and provides these maps to ALTO clients, such as ALTO client 18 of request router 16. A network map contains network location identifiers, or PIDs, that each represents one or more network devices in a network. In general, a PID may represent a single device or device component, a collection of devices such as a network subnet, a service provider network such as one of autonomous systems 4, or some other grouping. A cost map contains cost entries for pairs of PIDs represented in the network map and an associated value that represents a cost to traverse a network path between the members of the PID pair. The value can be ordinal (i.e., ranked) or numerical (e.g., actual). ALTO server 14 may generate the network maps and cost maps by obtaining routing information from other devices in network 2 and then applying policies to the routing information to aggregate endpoint devices into PIDs and calculate costs, per a specified criteria such as transmission cost or node priority, for traversing a network path between members of PID pairs. In some embodiments, a service/content provider administrator or a third party provisions ALTO server 14 with at least a portion of a network map and a cost map. Further details regarding generating network and cost maps for a multi-domain network are found in Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010, the entire contents of which are incorporated herein by reference.

In some embodiments, ALTO server 14 provides an endpoint cost service. In such embodiments, ALTO client 18 or one of hosts 10 (operating as a peer for a P2P application) provides a list of one or more endpoints, such as CDN nodes 12, and an identifier for a receiving one of hosts 10 to ALTO server 14. ALTO server 14 uses network and cost maps generated in accordance with the location-based techniques herein described to determine an optimal endpoint in the list of endpoints received for the receiving host. ALTO server 14 returns the optimal endpoint to ALTO client 18 or to the requesting one of hosts 10. In some embodiments of ALTO server 14 that implement an endpoint cost service, ALTO server 14 returns a list of the endpoints in a rank ordering according to cost or returns a list of the endpoints with associated costs for each endpoint.

ALTO server 14 generates or modifies network maps to include PID attributes for PIDs described therein. A PID attribute value for a PID is a string or other value that identifies a type or class of endpoint associated with the PID. An endpoint type may disambiguate, for ALTO server 14, PIDs according to a layer sever (L7) behavior of the endpoints associated with the respective PIDs. For instance, a particular PID within a network may include a PID attribute value identifying the endpoints of the PID as being of type "host." Example types for endpoints may include, for instance, "host," "CDN node," "mobile host," and "wireline host." A PID attribute value may comprise a string, bitstring, or integer, for instance. Further example details regarding specifying and using a PID type for PIDs can be found in Medved et al., U.S. patent application Ser. No. 12/861,671, entitled "APPLICATION-LAYER TRAFFIC OPTIMIZATION SERVICE ENDPOINT TYPE ATTRIBUTE," filed Aug. 23, 2010, the entire contents of which are incorporated herein by reference.

ALTO server 14 may comprise, for example, a high-end server or other service device, a content indexer for a P2P application, or a service card insertable into a network device, such as a router or switch. ALTO server 14 may operate as an element of a service plane of a router to provide ALTO services in accordance with the techniques of this disclosure.

In accordance with the techniques herein described, ALTO server 14 executes an interior routing protocol session, such as an IBGP session, to the one of routing protocol speakers 5 within its autonomous system 4C. In some embodiments, the routing protocol speaker 5 within autonomous system 4C comprises a route reflector that reflects routes received from ASBR 6C or other routing protocol speakers within autonomous system 4C, for example, to ALTO Server 14 in peering session 9. In this way ALTO Server 14 receives, in peering session 9, topology information for respective autonomous systems 4 advertised or forwarded by ASBR 6C. In other words, ALTO server 14 is a passive EGP listener that receives topology information advertised or forwarded by ASBR 6C or routing protocol speaker 5 in autonomous system 4C. The EGP used for EGP peering session 9 may comprise, for instance, the Exterior Gateway Protocol or Border Gateway Protocol (BGP). Peering session 9 may comprise a Transmission Control Protocol (TCP) session between ASBR 6C and ALTO server 14. In some embodiments, peering session 9 is a peering session for an interior gateway protocol, such as internal BGP (IBGP).

In accordance with the techniques herein described, ASBRs 6 and/or routing protocol speakers 5 incorporate endpoint type identifiers into topology information outputted by the ASBRs in peering sessions. Autonomous system 4 administrators, or another entity, assigns within the corresponding one of ASBRs 6 and/or respective routing protocol speakers 5 for the administrated autonomous system, an endpoint type to one or more network address subnets for which the ASBR originates or forwards topology information. For each subnet typed in this manner, ASBRs 6 and/or routing protocol speakers 5 add an endpoint type identifier for the assigned type to an EGP message that includes topology information that traverses or originates with the respective ASBR and that identifies the subnet. An endpoint type identifier to identify such types in an EGP message may comprise a string, bitstring, or integer, for instance. The EGP message may comprise, for example, a route advertisement.

In the illustrated embodiment, for example, ASBR 6B includes configuration information that identifies a network address subnet that includes one or more of hosts 10 as including endpoints of type "host." Upon receipt of topology information for advertisement that includes the network address subnet, from an interior gateway protocol executing within autonomous system 4B for instance, ASBR 6B adds an endpoint type identifier to the advertisement identifying the subnet as including endpoints of type "host" before outputting the advertisement to ASBRs 6A, 6C in respective peering sessions 7. In some instances, one of routing protocol speakers 5 within autonomous system 4B adds an endpoint type identifier to an advertisement identifying the subnet as including endpoints of type "host" before outputting the advertisement to ASBR 6B, which sends the advertisement to ASBRs 6A, 6C in respective peering sessions 7. ASBR 6C sends the advertisement to the routing protocol speaker 5 within autonomous system 4C, which provides the advertisement to ALTO server 14 in peering session 9. In some embodiments, ASBR 6C and sends the advertisement directly to ALTO server 14.

As another example, the routing protocol speaker 5 within autonomous system 4C may include configuration information that identifies a network address subnet that includes CDN nodes 12B, 12C as including endpoints of type "CDN node." The routing protocol speaker 5 within autonomous system 4C adds the endpoint type identifier "CDN node" to advertisements that includes the network address subnet and outputs the advertisement to ALTO server 14 via peering session 9.

As another example, ASBR 6C may include configuration information that identifies a network address subnet that includes CDN node 12A of autonomous system 4A as including endpoints of type "CDN node." Upon receipt of topology information in an advertisement that includes the network address subnet that includes CDN node 12A, ASBR 6C adds the endpoint type identifier "CDN node" to the advertisement and forwards the advertisement to the routing protocol speaker 5 within autonomous system 4C, which forwards the advertisement to ALTO server 14 via peering session 9. ALTO server 14 therefore receives advertisements that identify endpoint types for subnets of remote autonomous system 4A.

As a still further example, ASBR 6C forwards advertisements received from ASBR 6B via a peering session 7 to ALTO server 14 via peering session 9. Such advertisements may include an endpoint type identifier for a subnet that includes one or more of hosts 10. ALTO server 14 therefore receives advertisements that identify endpoint types for subnets of remote autonomous system 4B.

Upon receiving topology information in an advertisement that includes an endpoint type identifier, ALTO server 14 dynamically generates or modifies a network map to incorporate the endpoint type identifier. Specifically, ALTO server 14 maps the endpoint type identifier to a PID attribute value and assigns the PID attribute value to a PID associated with a subnet identified in the route advertisement. ALTO server 14 may perform the mapping and assignment during PID generation or as an aspect of PID modification for a network map. As a result, the network map includes PIDs having PID attribute values dynamically assigned using current topology information provided by the various ASBRs 6 and routing protocol speakers 5.

ALTO server 14 provides a network map that includes PID attributes dynamically assigned to incorporate endpoint type identifiers received in EGP messages to ALTO client 18. ALTO server 14 may use the dynamically assigned PID attributes to disambiguate multiple PIDs according to respective associated endpoint types. ALTO server 14 may therefore generate and provide a cost map that accounts for the different types to improve node selection by request router 16. For example, ALTO server 14 may use PID attributes to generate and provide a cost map that has cost map entry values set to infinity for inter-"CDN node" pairs and inter-"host" pairs. Request router 16, upon receiving a content request (e.g. an HTTP GET request) from one of hosts 10, consequently selects one of CDN nodes 12 as the content resource due to infinite costs specified in the cost map for paths to others of hosts 10. In some embodiments, ALTO server 14 implements an endpoint cost service for use by request router 16 or by hosts 10 implementing a P2P application.

Dynamically generating attributes from routing topology information may allow the providers, individually responsible for various subnets of network 2 that includes multiple autonomous systems 4, to inform applications via the ALTO service of application-relevant subnet characteristics. In other words, the operator "close to" a subnet can be responsible for the treatment of that subnet by ASBRs 6, ALTO server 14, and client 18. As one illustration, the administrator of autonomous system 4A may configure ASBR 6A to include an endpoint type identifier in an EGP message that identifies a subnet that includes CDN nodes 12A to specify, to ALTO server 14, that the PID is to have a PID attribute of type "CDN node." Because the administrator of autonomous system 4A typically has a fuller knowledge of the configuration of autonomous system 4A than does the administrator of autonomous system 4C, the techniques may thus improve subsidiarity among network entities and operators that cooperate to facilitate content distribution, thereby relieving configuration pressures on the administrator of ALTO server 14.

Figure 2:
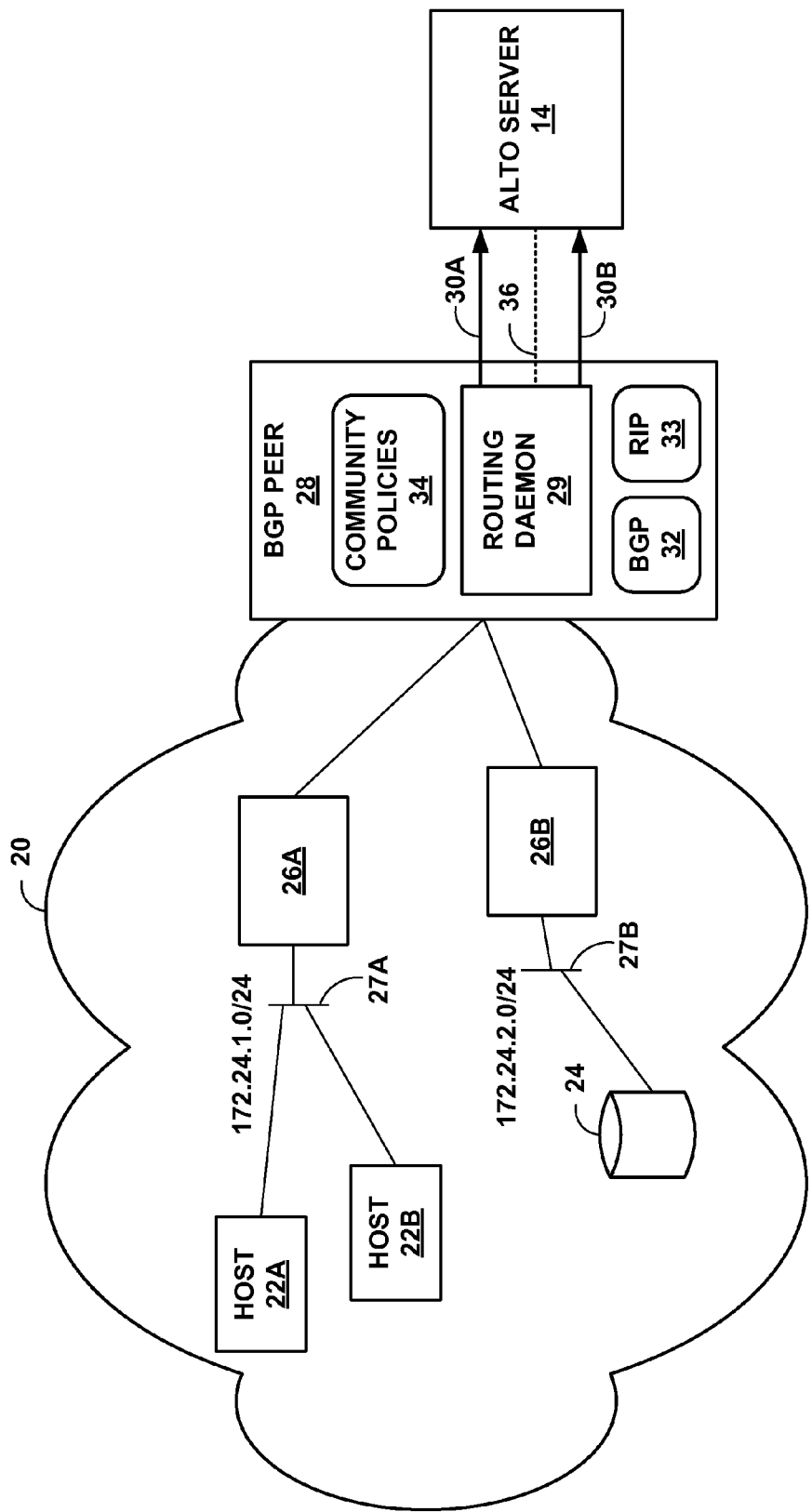
FIG. 2 is a block diagram illustrating an example service provider network having an example Border Gateway Protocol (BGP) peer that communicates with an ALTO server to facilitate the dynamic PID attribute value assignment techniques of this disclosure.

FIG. 2 is a block diagram illustrating an example service provider network 20 ("SP network 20") having an example Border Gateway Protocol (BGP) peer 28 that communicates with ALTO server 14 to facilitate the dynamic PID attribute value assignment techniques of this disclosure. Service provider network 20, BGP peer 28, and ALTO server 14 may represent example embodiments of one of autonomous systems 4, ASBR 6, and ALTO server 14, respectively, of FIG. 1.

Service provider network 20 includes at least the two illustrated subnets 27A-27B ("subnets 27") with routers 26A, 26B occupying a node of an interior route from the respective subnets to BGP peer 28. Subnet 27A encompasses network address prefix 172.24.1.0/24 and includes hosts 22A-22B, which may represent example embodiments of one of hosts 10 of FIG. 1. Subnet 27B encompasses network address prefix 172.24.2.0/24 and includes content delivery network node 24, which may represent an example embodiment of one of CDN nodes 12 of FIG. 1. Routers 26 may represent example embodiments of routing protocol speakers 5 of FIG. 1.

Routers 26 and routing daemon 29 of BGP peer 28 execute Routing Information Protocol 33 ("RIP 33"), an interior gateway protocol to provide connectively between routers 26 and BGP peer 28. Routing daemon 29 additionally executes Border Gateway Protocol 32 ("BGP 32") to advertise, in BGP UPDATE messages, routes learned by executing RIP 33. RIP 33 is an example interior routing protocol and may represent in other embodiments another interior routing protocol, such as IBGP. Such messages may advertise BGP peer 28 as a next hop for the address prefixes encompassed by subnets 27. BGP peer 28 may store routes for exterior advertisement in an Adj-RIB-Out. In some embodiments, routing daemon 29 and routers 26 may execute another interior gateway protocol to exchange interior routes. BGP peer 28 may comprise a control unit (not shown) that includes one or more processors to provide an operating environment for routing daemon 29.

ALTO server 14 is a passive BGP listener and receives route advertisements from BGP peers, including BGP peer 28. Routing daemon 29 is configured with a set of BGP peers to which routing daemon 29 is to advertise routes in BGP UPDATE messages. Routing daemon 29 and ALTO server 14 establish BGP peering session 36 with which routing daemon 29 provides BGP UPDATE messages 30A-30B ("BGP UPDATE messages 30") to ALTO server 14. BGP UPDATE message 30A is a route advertisement that announces a route to the address prefix corresponding to subnet 27A. BGP UPDATE message 30B is a route advertisement that announces a route to the address prefix corresponding to subnet 27B. BGP peer 28 and ALTO server 14 may not be directly connected. That is, BGP peering session 36 may traverse one or more intermediate routers, including one or more additional BGP speakers or peers.

BGP peer 28 comprises community policies 34, a set of one or more BGP policies that specify, for one or more advertised routes, community values to be set by BGP peer 28 for community attributes of the routes. In general, a community attribute identifies a prefix reachable using an advertised route as having some quality in common with other prefixes in a network. Including community path attributes with advertised routes enables BGP peers to group prefixes and enact routing policies specific to the group of prefixes. A community path attribute value is typically a 32-bit integer or an autonomous system number combined with a 32-bit integer. In some instances, community policies 34 may specify community values for extended community attributes. Additional information regarding the BGP community attribute is described in further detail in R. Chandra et al., RFC 1997, "BGP Communities Attribute," Network Working Group, the Internet Engineering Task Force, August, 1996, the entire content of which is incorporated by reference herein. An administrator or software agent may add, modify, and delete community policies 34 of BGP peer 28 using an administrative interface (not shown).

In the illustrated embodiment, community policies 34 includes a first community policy that directs routing daemon 29 to incorporate, into BGP UPDATE message 30A, a community attribute value that identifies the prefix corresponding to subnet 27A as including endpoints having type "host" to reflect the inclusion of hosts 22A-22B in subnet 27A. Community policies 34 includes a second community policy that directs routing daemon 29 to incorporate, into BGP UPDATE message 30B, a community attribute value that identifies the prefix corresponding to subnet 27B as including endpoints having type "CDN node" to reflect the inclusion of CDN node 24 within subnet 27B. Consequently, community policies 34 enable BGP peer 28 to advertise routes to two different subnets of SP network 20 that include network devices having different endpoint types.

In some embodiments, community policies 34 is distributed to routers 26 for application to interior routing protocol routes advertised by those routers. In such embodiments, routers 26 perform the above-described techniques to modify routes advertised to BGP peer 28, which then reconstitutes, if necessary, and forwards the routes as BGP UPDATE message 30.

Routing daemon 29 outputs BGP UPDATE messages 30 generated in accordance with community policies 34. ALTO server 14 receives BGP UPDATE message 30A, maps the community attribute value therein to a PID attribute value identifying the endpoints of the PID as type "host," and generates or modifies the PID associated with the prefix corresponding to subnet 27A to specify the mapped PID attribute value. Similarly, upon receiving BGP UPDATE message 30B, ALTO server 14 maps the community attribute value therein to a PID attribute value identifying the endpoints of the PID as type "CDN node," and generates or modifies the PID associated with the prefix corresponding to subnet 27A to specify the mapped PID attribute value.

ALTO server 14 collects generated and/or modified PIDs into a network map and also generates a cost map for the network map that accounts for the dynamically PID attribute values specified by one or more PIDs of the network map. ALTO server 14 may output the network and cost maps to an ALTO client or, in some embodiments, may implement an endpoint cost service using the network and cost maps.

Figure 3A:
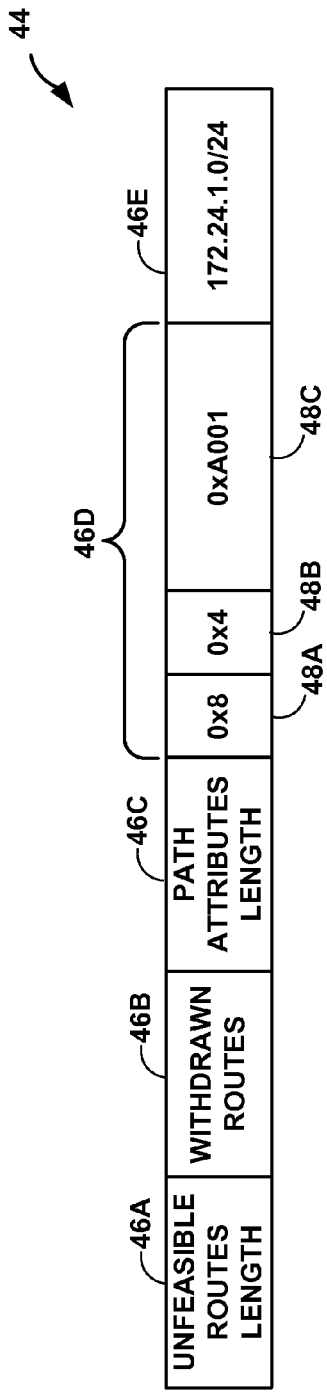
FIGS. 3A-3B are block diagrams illustrating example BGP UPDATE payloads that each include a community attribute that identifies a type of endpoint advertised.

FIG. 3A is a block diagram illustrating BGP UPDATE payload 44, an example embodiment of a payload of BGP UPDATE message 30A of FIG. 2. For ease of illustration, a corresponding BGP header is not shown in FIG. 3A. BGP UPDATE payload 44 includes subfields 46A-46E. Subfields 46A and 46B specify a total length and identify any withdrawn routes, respectively. Subfield 46C specifies a total length of attributes of type-length-value (TLV) subfield 46D. In the illustrated embodiment, subfield 46D includes one TLV entry that comprises type 48A, length 48B, and value 48C. Type 48A having value 0x8 and length 48B of value 0x4 indicates a four byte community attribute value. In this instance, value 48C is 0xA001, an endpoint type identifier that, in this example, indicates Network Layer Reachability Information (NLRI) in subfield 46E includes a destination prefix that encompasses endpoints of type "host." Subfield 46E includes NLRI that includes the destination prefix for subnet 27A of FIG. 2. In some embodiments, subfield 46D may include an extended community attribute to specify an endpoint type identifier.

Figure 3B:
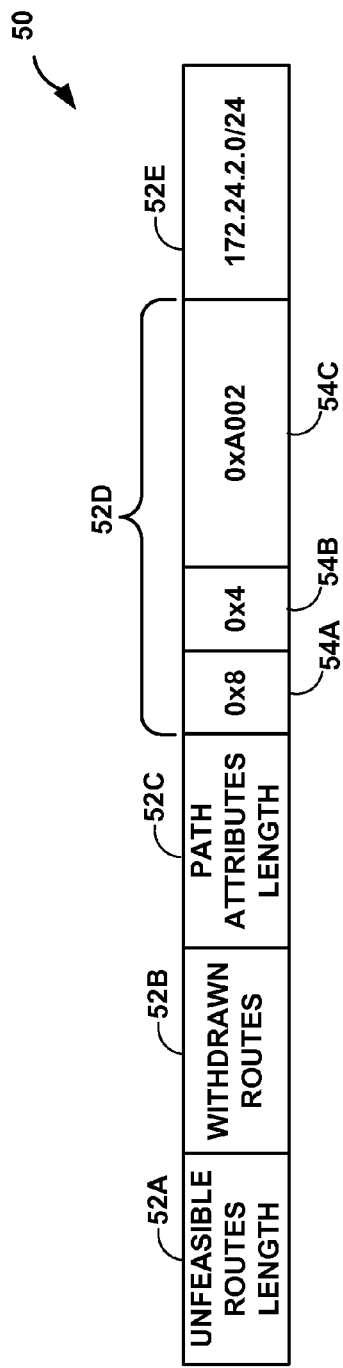

FIG. 3B is a block diagram illustrating BGP UPDATE payload 50, an example embodiment of a payload of BGP UPDATE message 30B of FIG. 2. For ease of illustration, a corresponding BGP header is not shown in FIG. 3B. BGP UPDATE payload 50 includes subfields 52A-52E. Subfields 52A and 52B specify a total length and identify any withdrawn routes, respectively. Subfield 52C specifies a total length of the path attributes of type-length-value (TLV) subfield 52D. Subfield 52D includes one TLV entry comprising type 54A, length 54B, and value 54C. Type 54A having value 0x8 and length 54B of value 0x4 indicates a four byte community attribute value. In this instance, value 54C is 0xA002, an endpoint type identifier that, in this example, indicates Network Layer Reachability Information (NLRI) in subfield 52E includes a destination prefix that encompasses endpoints of type "CDN node." Subfield 52E includes NLRI that includes the destination prefix for subnet 27B of FIG. 2. In some embodiments, subfield 52D may include an extended community attribute to specify an endpoint type identifier.

Additional community attribute values may identify other types of endpoints, including "mobile hosts," "wireless hosts," and "data center," for example. The example community attribute values of BGP UPDATE payload 40, 50 are merely examples, and other values may be used. In some embodiments, the community attribute value may be an autonomous system number combined with a 32-bit integer.

Figure 4:
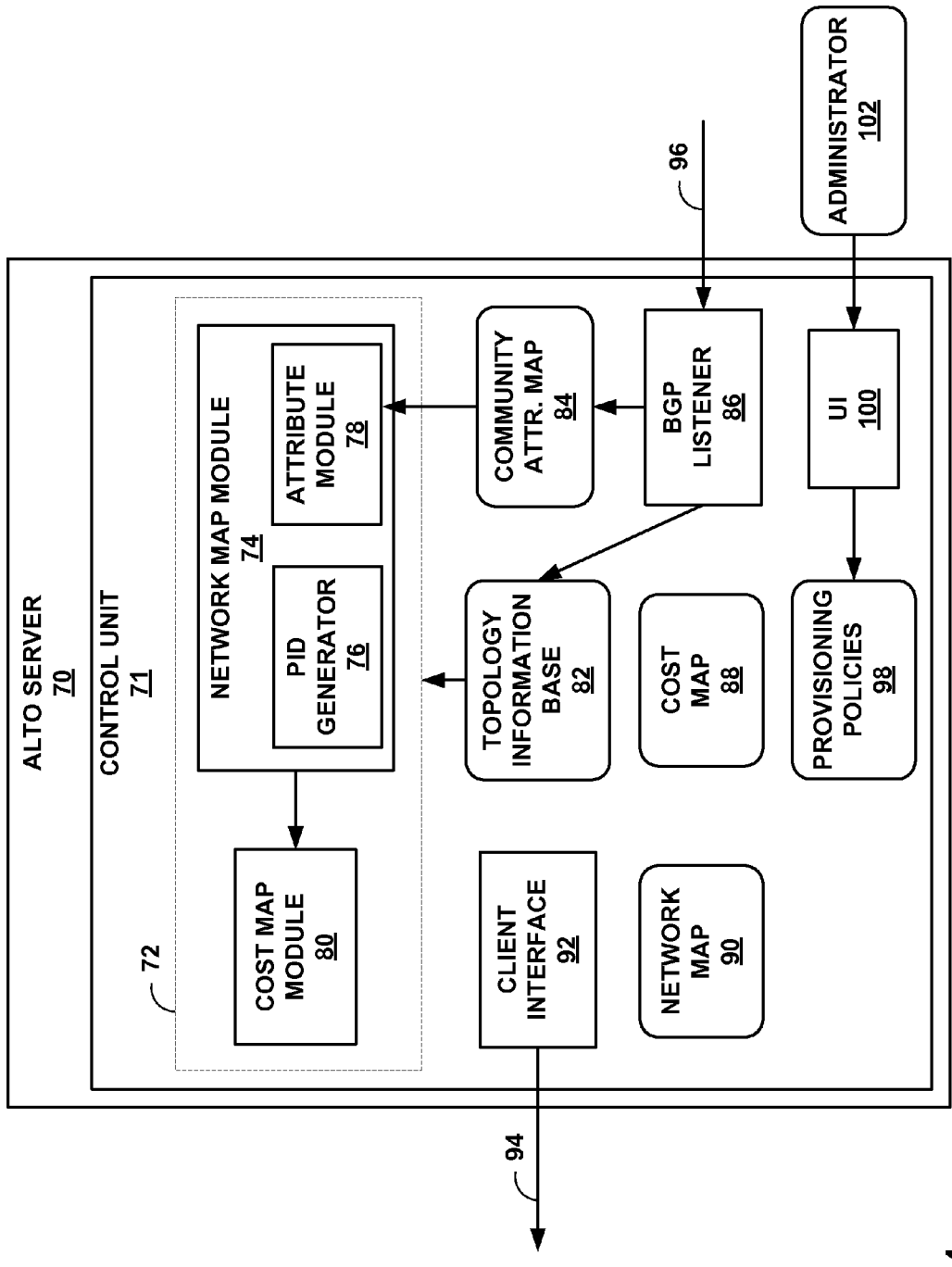
FIG. 4 is a block diagram illustrating, in detail, an example ALTO server that receives BGP UPDATE messages and dynamically assigns PID attribute values in accordance with the described techniques.

FIG. 4 is a block diagram illustrating, in detail, an example ALTO server 70 that receives BGP UPDATE messages and dynamically assigns PID attribute values in accordance with the described techniques. ALTO server 70 may represent an example embodiment of ALTO server 14 of FIG. 2. ALTO server 70 may be a server, network controller, network switch, or other computing device or appliance that includes one or more microprocessors that provide an operating environment for one or more software modules for generating and outputting ALTO network and cost maps in accordance with the described techniques. For purpose of clarity, components, such as a microprocessor, memory, keyboard, display, an operating system, network drivers and other components commonly found in such a computing device or appliance are not shown in FIG. 4. In some embodiments, ALTO server 70 comprises a router that includes one or more services units to apply services such as ALTO services as described herein. The services units may be distributed over one or more service cards or blades (not shown) that are inserted into rack slots of a router.

Control unit 71 of ALTO server 70 provides an operating environment for executing network map module 74, cost map module 80, client interface 92, and BGP listener 86. Control unit 71 may comprise one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein.

Map modules 72 of ALTO server 70 dynamically generate network map 90 and cost map 80 based at least on community attributes that specify endpoint types for advertised prefix received in BGP UPDATE messages. In addition, in the illustrated embodiment, ALTO server 70 comprises topology information base 82, a data structure that includes information regarding network topology, transmission costs for various network links, and other information that may be used by map modules 72 to generate ALTO-based maps (i.e., network map 90 and cost map 80). Topology information base 82 may comprise one or more routing information bases (RIBs). Network map module 74 of map modules 72 uses topology information base 82 and community map 84 to generate network map 90. Cost map module 88 of map modules 72 may use dynamically generated network map 90 and topology information base 82 to generate cost map 88.

User interface 100 of ALTO server 70 may comprise a command-line interface (CLI), a graphical user interface (GUI), a remote procedure call (RPC), or some other method to enable administrator 108 to configure topology information base 82 and provisioning policies 98 of ALTO server 70. Administrator 102 may be a network operator of, e.g., a service provider network, or a software agent executing, e.g., on a network management device. Administrator 102 provisions ALTO server 70 with provisioning policies 98, a set of policies that cause network map module 74 to generate network map 90 and cost map module 80 to generate cost map 88 in accordance with administrator preferences relating to transmission costs, load balancing, service-discrimination, PID grouping, PID attributes, or other preference areas. For example, provisioning policies 98 may direct network map module 74 and cost map module 80 to generate maps to cause content requests from PIDs having a particular attribute to be redirected to a particular CDN node.

BGP listener 86 is a routing protocol listener that executes BGP to peer with BGP speakers to receive BGP UPDATE messages that include NLRI for installation to topology information base 82. BGP listener 86 may store a Loc-RIB (Local Routing Information Base) and/or an Adj-RIB-In (Adjacent Routing Information Base, Incoming) for each BGP peer of ALTO server 70 (not shown). In addition, administrator 102 may add, modify, or remove topology information from topology information base 82 using UI 100. In some embodiments, ALTO server 70 may execute additional interior gateway protocols, exterior gateway protocols, or other routing protocols to provision topology information base 82 with routing information with which to generate network map 90 and cost map 88.

Community attribute map 84 (illustrated as "community attr. map 84") is an associative data structure, such as a table, list, or map, that maps community attribute values to corresponding PID attribute values. Community attributes and PID attributes may be derived from different namespaces. For example, a community attribute is typically a four byte integer, while a PID attribute may be a string. Community attribute map 84 operates as a lookup data structure that is keyed to community attribute values. That is, for a community attribute value (e.g., a value that specifies endpoints of type "CDN node"), community attribute map 84 provides a corresponding PID attribute value (e.g., a value that identifies PIDs associated with endpoints of type "CDN node").

In some instances, BGP listener 86 receives BGP UPDATE messages, such as BGP UPDATE message 96, that include community attributes that specify endpoint types for destination prefixes in NLRI of the messages. BGP listener 86 extracts the advertised route from BGP UPDATE message 96 and installs the route, if necessary, to topology information base 82. BGP listener 86 also extracts one or more community attribute values carried in a path attributes field of the BGP UPDATE message 96 and queries community attribute map 84 to determine whether any of the extracted community attribute values map to a PID attribute value. BGP listener 86 passes any mapped PID attribute value to network map module 74 and notifies network map module 74 that the advertised route in BGP UPDATE message 96 includes a community attribute that specifies an endpoint type for the NLRI destination prefix.

PID generator 76 aggregates endpoints described in topology information base into PIDs. Upon receiving notice that the advertised route in BGP UPDATE message 96 includes a community attribute that specifies an endpoint type for the NLRI destination prefix (i.e., an advertised endpoint), PID generator 76 aggregates the destination prefix into a new PID or modifies an existing PID to incorporate the destination prefix. Attribute module 78 assigns the PID attribute value, mapped by BGP listener 86 using the community attribute value received in BGP UPDATE message 96, to the new or modified PID that includes the destination prefix.

Network map module 74 constitutes the aggregated PIDs generated by PID generator 76 into network map 90. Network map module 74 thus generates ALTO network map 90 in a manner that specifies attribute for endpoints associated with one or more of the PIDs of the network map 90. Cost map module 80 applies provisioning policies 98 to network map 90 and, in some instances, topology information base 82 to generate a corresponding cost map 88 for the network map. PID attributes for PIDs of network map 90 dynamically determined from BGP UPDATE messages, such as BGP UPDATE message 96, may affect determination by cost map module 80 of inter-PID costs. For example, provisioning policies 98 may include a policy requiring cost map module 80 to set to infinity inter-PID costs for PID pairs having PIDs that both include a PID attribute value of "host." In this example, an application using the ALTO service provided by ALTO server 70 that receives a content request from a host endpoint will therefore not select another host endpoint to serve the requested content. The application, in the form of a request router for example, may instead select a CDN node.

Client interface 92 exposes an ALTO server interface to enable ALTO clients to request and receive network and cost maps for an application for the network. Client interface 92 sends a copy of network map 90 and cost map 88 to a requesting client in maps upload message 94. Client interface 92 may execute one or more protocols to obtain network addresses of ALTO clients in the network, and the client interface maintains these network addresses so as to push incremental updates of the maps to the clients. Example interfaces for client interface 92 may include Simple Object Access Protocol (SOAP) or other eXtensible Markup Language (XML) interfaces, a CLI or GUI, Simple Network Management Protocol (SNMP), Remote Procedure Calls (RPCs), and a Common Object Request Broker Architecture (CORBA) interface, for example.

In some embodiments of ALTO server 70, client interface 92 implements an endpoint cost service. When client interface 92 receives, from a client, a list of endpoints represented in network map 90, client interface 92 returns an ordinally ranked list of the endpoints or the costs, specified by cost map 88, between the endpoints and the client or between the endpoints and another specified source node. Alternatively, client interface 92 returns costs between each of the endpoints and the client or between each of the endpoint and another specified source node.

Figure 5:
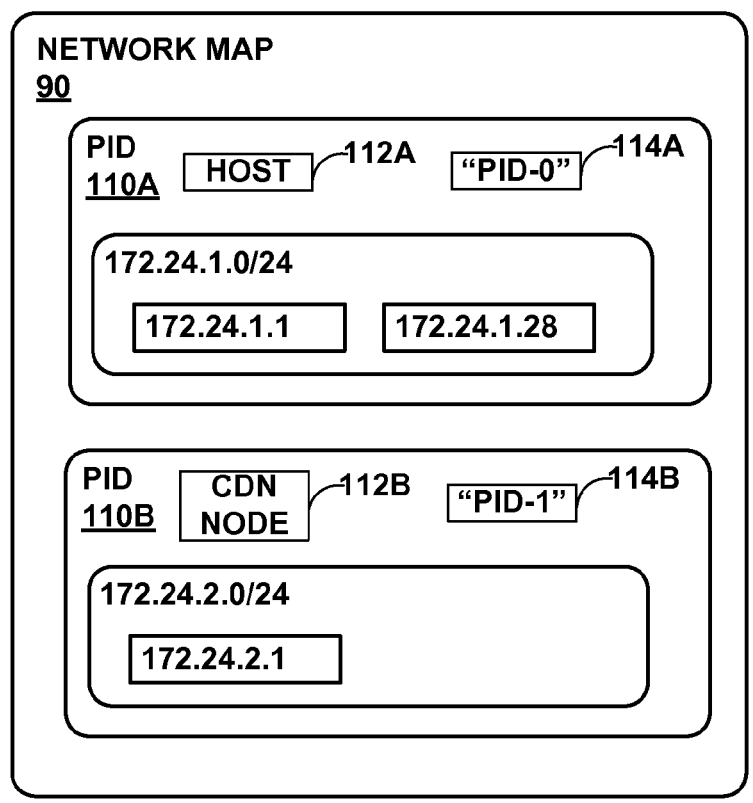
FIG. 5 is a block diagram illustrating, in detail, an example network map 90 generated using dynamically determined PID attribute values.

FIG. 5 is a block diagram illustrating network map 90 of FIG. 4, generated using dynamically determined PID attribute values, in further detail. The example network map 90 represents at least a portion of an ALTO-based network map for SP network 20 after receipt of BGP UPDATE messages 30 of FIG. 2.

Network map 90 comprises a set of PID entries ("PIDs") 110A-110B each identified by a respective one of PID identifier values 114A-114B. Each of PIDs 110 constitutes an indirect and network-agnostic aggregation mechanism to represent, for instance, one or more individual endpoints, one or more subnets, metropolitan areas, points of presence ("PoPs"), one or more autonomous systems, or any combination thereof. For instance, PID 110B represents an endpoint having IP address 172.24.2.1 and has the network location identifier value "PID-1." PIDs 110 may be aggregated and network location identifiers 114 may be assigned according to any number of criteria. In some instances, an ALTO server aggregates the endpoints, subnets, etc. into one of PIDs 110 by geographical proximity. Aggregation of network endpoints into PIDs 110 provides scalability and privacy by decoupling network endpoints from their identifiers in the ALTO context. In particular, aggregation reduces the size of costs maps by reducing the size of the network and masks the network topology underlying a particular PID (representing, e.g, an autonomous system).

In the illustrated embodiment, PID 110A is associated with a prefix corresponding to subnet 27A of FIG. 2 and network addresses 172.24.1.1 and 172.24.1.28 of respective hosts 22A, 22B. Similarly, PID 110B is associated with a prefix corresponding to subnet 27B of FIG. 2 and network addresses 172.24.2.1 of CDN node 24. In accordance with the techniques herein described, each of exemplary PIDs 110 includes a respective one of PID-type fields 112A-112B that stores a dynamically determined and assigned PID attribute value for the PID. For instance, PID 110A includes PID-type field 112A that specifies a "host" PID-type for PID 110A, while PID 110B includes PID-type field 112B that specifies a "CDN node" PID-type for PID 110B. PID 110A thus identifies endpoints of type "host" and PID 110B identifies endpoints of type "CDN node".

PID-type fields 112 are attributes of respective PIDs 110 and enable an ALTO service to take PID attribute value-specific actions. PID attribute values may be passed by the ALTO server as a constraint to a map filtering service. For example, an ALTO server, such as ALTO server 70 of FIG. 4, may set cost entries of an cost map that specify costs between two PIDs of type "host" to a value of infinity. A redirector or other resource selector using the cost map to select a resource for a requesting host will thus avoid selecting another host as a resource in favor of a resource with a PID of type "CDN node." In some embodiments, the ALTO server may filter cost entries to avoid sending such entries to ALTO clients. Rather, the ALTO server advertises a sparse matrix of cost entries to ALTO clients. In such embodiments, the ALTO clients assume that the default cost of any missing cost entries in a received cost map is infinity.

Figure 6:
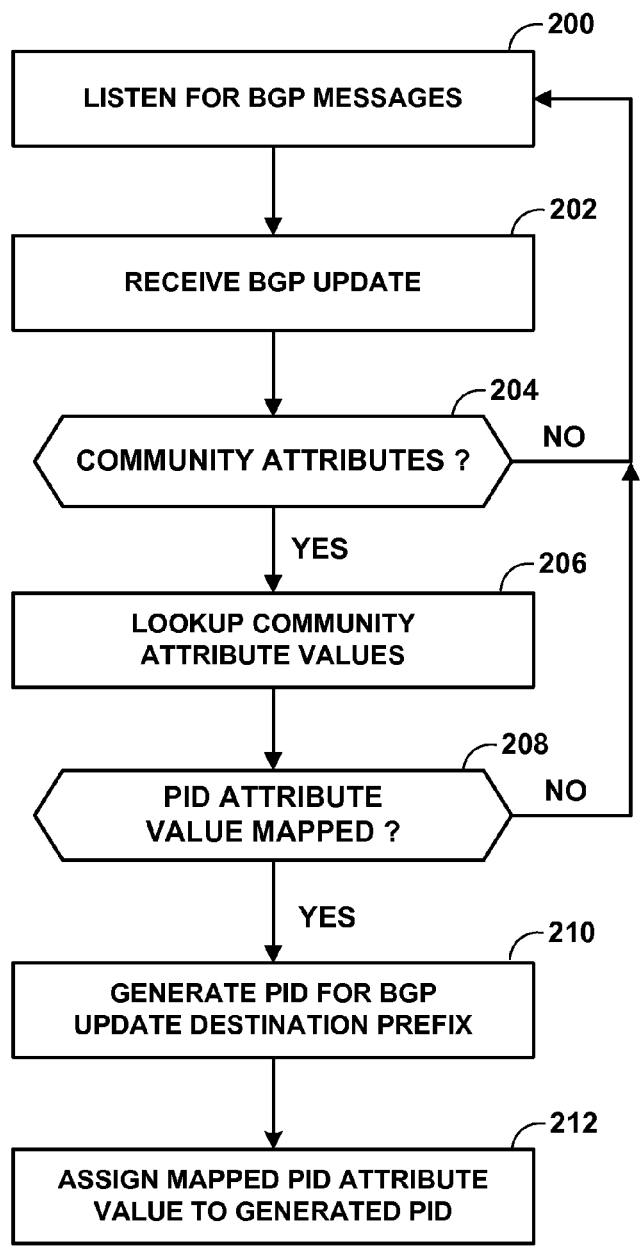
FIG. 6 is a flowchart illustrating an example mode of operation of an ALTO server to dynamically determine and assign PID attribute values based at least on community attributes received in BGP UPDATE messages.

FIG. 6 is a flowchart illustrating an example mode of operation of ALTO server 70 of FIG. 4 to dynamically determine and assign PID attribute values based at least on community attributes received in BGP UPDATE messages. BGP listener 86 executes BGP to peer with BGP speakers to receive BGP messages (200). BGP listener 86 receives BGP UPDATE message 96 (202) and determines whether BGP UPDATE message 96 includes one or more community path attributes (204). If the message includes community path attributes (YES branch of (204), BGP listener 86 uses the community attribute values as lookup values to community attribute map 84 to attempt to map the community attribute values to a PID attribute value (206). If none of the community attribute values map to a PID attribute value (NO branch of 208), BGP listener 86 listens for additional BGP messages (200).

When BGP listener 86 maps a PID attribute value from any of the community attribute values extracted from BGP UPDATE message 96 (YES branch of 208), PID generator 76 aggregates a destination prefix received in BGP UPDATE message 96 into a new PID or modifies an existing PID to incorporate the destination prefix (210). Attribute module 78 assigns the mapped PID attribute value to the new or modified PID that includes the destination prefix (212).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
executing, with an application-layer traffic optimization (ALTO) server, a routing protocol to maintain layer three (L3) network topology information defining routes to endpoints of a network;
receiving, with the ALTO server, a topology information advertisement that conforms to the routing protocol, wherein the topology information advertisement specifies one or more routes and includes network address information identifying one or more of the endpoints, wherein the topology information advertisement further includes an endpoint type identifier set to one of a first value and a second value, wherein the first value specifies the identified endpoints are consumers of a content delivery service and the second value specifies the identified endpoints are providers of a content delivery service;
aggregating, with the ALTO server, the endpoints into one or more topological groupings associated with respective provider-defined identifiers (PIDs), wherein each PID of the PIDs is associated with a different subset of the endpoints;
assigning a PID attribute value corresponding to the endpoint type identifier to each PID of the PIDs associated with any of the identified endpoints, wherein the PID attribute value assigned to a PID specifies an endpoint type for endpoints associated with the PID; and
generating, with the ALTO server, an ALTO network map that includes a respective PID entry to describe each PID of the PIDs associated with any of the identified endpoints, wherein each PID entry includes a PID-type field that stores the assigned PID attribute value for the PID described by the PID entry.

2. The method of claim 1, wherein each endpoint associated with a particular PID of the PIDs is the same endpoint type.

3. The method of claim 1,
wherein the topology information advertisement comprises a Border Gateway Protocol (BGP) UPDATE message, and
wherein the network address information comprises Network Layer Reachability Information of the BGP UPDATE message.

4. The method of claim 3, wherein the endpoint type identifier is a community path attribute value of the BGP UPDATE message.

5. The method of claim 1, further comprising mapping the endpoint type identifier to the PID attribute value.

6. The method of claim 1, further comprising:
setting cost values for cost entries that specify pairs of PIDs that include members having the same PID attribute value to infinity; and
outputting cost entries from the ALTO server to an ALTO client as an ALTO cost map for the network.

7. The method of claim 1, wherein the endpoint type identifier specifies the identified endpoints as either a layer seven (L7) content consumer or L7 content source.

8. A method comprising:
receiving, with the network device, routing information according to an interior gateway protocol, wherein the routing information includes a network address prefix identifying the endpoints of the network;
determining, with the network device by applying a community policy that specifies an endpoint type identifier for the endpoints of the network, the endpoint type identifier for the endpoints of the network, wherein the endpoint type identifier for the endpoints of the network identifies the endpoints of the network as one of consumers of a content delivery service and providers of a content delivery service;
generating, with the network device, a topology information advertisement that includes the network address prefix identifying the endpoints of the network and that includes the endpoint type identifier for the endpoints of the network; and
outputting the topology information advertisement to an application-layer traffic optimization (ALTO) server to cause the ALTO server to assign a provider-defined identifier (PID) attribute value corresponding to the endpoint type identifier to at least one PID associated with at least one of the endpoints of the network.

9. The method of claim 8,
wherein the topology information advertisement comprises a Border Gateway Protocol (BGP) UPDATE message, and
wherein the topology information advertisement comprises Network Layer Reachability Information of the BGP UPDATE message, the Network Layer Reachability Information specifying the network address prefix identifying the endpoints of the network.

10. The method of claim 9, wherein the endpoint type identifier is a community path attribute value of the BGP UPDATE message.

11. The method of claim 8, wherein the endpoint type identifier identifies the subset of the endpoints as including a content delivery network (CDN) cache node that operates as an intermediate cache for application-layer content to be delivered to other endpoints.

12. The method of claim 8, wherein the endpoint type identifier is a first endpoint type identifier, the endpoints comprise a first subset of endpoints of the network, the community policy comprises a first community policy, and the topology information advertisement comprises a first topology information advertisement, the method further comprising:
determining, with the network device by applying a second community policy that specifies a second endpoint type identifier for a second subset of endpoints of the network, the second endpoint type identifier for the second subset of the endpoints of the network, wherein the second endpoint type identifier for the second subset of the endpoints of the network identifies the second subset of the endpoints of the network as one of consumers of a content delivery service and providers of a content delivery service, and wherein the second endpoint type identifier is different than the first endpoint type identifier;
generating, with the network device, a second topology information advertisement that includes the network address prefix corresponding to the second subset of the endpoints and that includes the second endpoint type identifier for the second subset of the endpoints;
outputting the second topology information advertisement.

13. An application-layer traffic optimization (ALTO) server comprising:

a control unit comprising one or more processors;
a topology information base of the control unit that stores network topology information for endpoints of a network;
a routing protocol listener of the control unit that executes a routing protocol to maintain layer three (L3) network topology information defining routes within the network, wherein the routing protocol receives a topology information advertisement that conforms to the routing protocol, specifies one or more routes, and includes network address information identifying one or more of the endpoints, wherein the topology information advertisement further includes an endpoint type identifier set to one of a first value and a second value, wherein the first value specifies the identified endpoints are consumers of a content delivery service and the second value specifies the identified endpoints are providers of a content delivery service;
a PID generator of the control unit that aggregates the endpoints into one or more topological groupings associated with respective provider-defined identifiers (PIDs), wherein each PID of the PIDs is associated with a different subset of the endpoints;
an attribute module of the control unit that assigns a PID attribute value corresponding to the endpoint type identifier to each PID of the PIDs associated with any of the identified endpoints, wherein the PID attribute value assigned to a PID specifies an endpoint type for of endpoints associated with the PID; and
a network map module that generates an ALTO network map that includes a respective PID entry to describe each PID of the PIDs associated with any of the identified endpoints, wherein each PID entry includes a PID-type field that stores the assigned PID attribute value for the PID described by the PID entry.

14. The ALTO server of claim 13,
wherein the topology information advertisement comprises a Border Gateway Protocol (BGP) UPDATE message, and
wherein the network address information comprises Network Layer Reachability Information of the BGP UPDATE message.

15. The ALTO server of claim 14, wherein the endpoint type identifier is a community path attribute value of the BGP UPDATE message.

16. The ALTO server of claim 13, further comprising:
a community attribute map that maps the endpoint type identifier to the PID attribute value,
wherein the attribute module applies the community attribute map to map the endpoint type identifier to the PID attribute value.

17. The ALTO server of claim 13, further comprising:
a cost map module of the control unit that sets cost values for cost entries that specify pairs of PIDs that include members having the same PID attribute value to infinity; and
a client interface of the control unit that outputs cost entries to an ALTO client as an ALTO cost map for the network.

18. A network device that advertises layer three (L3) network topology information for a network, the network device comprising:
a control unit comprising one or more processors; and
a routing daemon of the control unit that:
receives routing information according to an interior gateway protocol, wherein the routing information includes a network address prefix identifying the endpoints of the network;

determines, by applying a community policy that specifies an endpoint type identifier for the endpoints of the network, the endpoint type identifier for the endpoints of the network, wherein the endpoint type identifier for the endpoints of the network identifies the endpoints of the network as one of consumers of a content delivery service and providers of a content delivery service;

generates a topology information advertisement that specifies one or more routes and includes the network address prefix identifying the endpoints of the network and that includes the endpoint type identifier for the endpoints of the network;

outputs the topology information advertisement to an application-layer traffic optimization (ALTO) server to cause the ALTO server to assign a provider-defined identifier (PID) attribute value corresponding to the endpoint type identifier to at least one PID associated with at least one of the endpoints of the network.

19. The network device of claim 18, wherein the topology information advertisement comprises a Border Gateway Protocol (BGP) UPDATE message, and wherein the topology information advertisement comprises Network Layer Reachability Information of the BGP UPDATE message, the Network Layer Reachability Information specifying the network address prefix identifying the endpoints of the network.

20. The network device of claim 19, wherein the endpoint type identifier is a community path attribute value of the BGP UPDATE message.

21. The network device of claim 18, wherein the endpoint type identifier identifies the subset of the endpoints as including a content delivery network (CDN) cache node.

* * * * *